United States Patent
Yu et al.

(10) Patent No.: US 7,377,416 B2
(45) Date of Patent: May 27, 2008

(54) ULTRASONIC WELDING HORN FOR WELDING A SEAM IN AN IMAGING RECEPTOR BELT

(75) Inventors: Robert C. U. Yu, Webster, NY (US); Michael S. Roetker, Webster, NY (US); David W. Martin, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 356 days.

(21) Appl. No.: 10/956,512

(22) Filed: Oct. 1, 2004

(65) Prior Publication Data

US 2006/0071048 A1    Apr. 6, 2006

(51) Int. Cl.
*B23K 1/06* (2006.01)
*B29C 65/08* (2006.01)

(52) U.S. Cl. .............. 228/110.1; 228/1.1; 156/73.1; 156/580.1

(58) Field of Classification Search .......... 228/1.1, 228/110.1; 156/73.1, 73.2, 73.3, 580.1, 580.2
See application file for complete search history.

(56) References Cited

U.S. PATENT DOCUMENTS

| 3,459,610 | A | | 8/1969 | Dijkers et al. ............ 156/73 |
|---|---|---|---|---|
| 3,562,041 | A | * | 2/1971 | Robertson ............... 156/73.1 |
| 5,110,403 | A | * | 5/1992 | Ehlert .................. 156/580.1 |
| 5,273,799 | A | * | 12/1993 | Yu et al. ................... 428/57 |
| 5,503,321 | A | * | 4/1996 | Urushima ................ 228/1.1 |
| 5,820,011 | A | * | 10/1998 | Ito et al. .................. 228/1.1 |
| 5,868,301 | A | * | 2/1999 | Distefano et al. ...... 228/180.21 |
| 5,906,698 | A | | 5/1999 | House et al. ............. 156/137 |
| 6,089,438 | A | * | 7/2000 | Suzuki et al. ............ 228/1.1 |
| 6,153,964 | A | * | 11/2000 | Olsson et al. ......... 310/323.18 |
| RE38,248 | E | * | 9/2003 | Yu et al. .................. 156/64 |
| 6,652,691 | B1 | | 11/2003 | Yu et al. .................. 156/137 |
| 6,815,131 | B2 | * | 11/2004 | Darcy, III ................ 430/56 |
| 6,849,836 | B2 | * | 2/2005 | Yu ........................ 219/619 |
| 7,094,048 | B2 | * | 8/2006 | Mishra et al. ............ 425/407 |
| 2004/0048176 | A1 | * | 3/2004 | Darcy, III ................ 430/56 |

FOREIGN PATENT DOCUMENTS

| EP | 475782 | * | 9/1990 |
|---|---|---|---|
| JP | 405029404 A | * | 2/1993 |
| JP | 2001-312086 | * | 11/2001 |

* cited by examiner

*Primary Examiner*—Kiley Stoner
(74) *Attorney, Agent, or Firm*—R. Hutter

(57) ABSTRACT

In ultrasonic welding of a seam, such as for creation of an imaging belt, an ultrasonic welding horn is applied to an overlap area. The welding horn has a contact surface within a certain set of dimensions comparable to the overlap area. The welding horn defines a conical main body that tapers to the dimensions of the contact area through a short length.

10 Claims, 6 Drawing Sheets

ULTRASONIC WELDING HORN FOR WELDING A SEAM IN AN IMAGING RECEPTOR BELT

INCORPORATION BY REFERENCE

U.S. Pat. No. 6,652,691 is hereby incorporated by reference, as a general background teaching of ultrasonic welding of photoreceptor belts such as used in xerography.

TECHNICAL FIELD

The present disclosure relates to ultrasonic welding, particularly of photoreceptor belts such as used in xerography.

BACKGROUND

Flexible electrostatographic belt imaging members are well known in the art. Typical electrostatographic flexible belt imaging members include, for example, photoreceptors for electrophotographic imaging systems, electroreceptors such as ionographic imaging members for electrographic imaging systems, and intermediate transfer belts for transferring toner images in electrophotographic and electrographic imaging systems. These belts are usually formed by cutting a rectangular sheet from a web containing at least one layer of thermoplastic polymeric material, overlapping opposite ends of the sheet, and joining the overlapped ends together to form a welded seam. The seam extends from one edge of the belt to the opposite edge. Generally, these belts comprise at least a supporting substrate layer and at least one imaging layer comprising thermoplastic polymeric matrix material. The "imaging layer" as employed herein is defined as the dielectric imaging layer of an electroreceptor belt, the transfer layer of an intermediate transfer belt and, the charge transport layer of an electrophotographic belt. Thus, the thermoplastic polymeric matrix material in the imaging layer is located in the upper portion of a cross section of an electrostatographic imaging member belt, the substrate layer being in the lower portion of the cross section of the electrostatographic imaging member belt. Although the flexible belts of interest consist of these mentioned types, nonetheless for simplicity reason, the discussion hereinafter will be focused only on the electrophotographic imaging member belts.

The flexible electrophotographic imaging member belts are fabricated from sheets cut from a web. The sheets are generally rectangular in shape. All edges may be of the same length or one pair of parallel edges may be longer than the other pair of parallel edges. The sheets are formed into a belt by joining overlapping opposite marginal end regions of the sheet. A seam is typically produced in the overlapping marginal end regions at the point of joining. Joining may be effected by any suitable means. Typical joining techniques include welding, gluing, taping, pressure heat fusing, and the like. Ultrasonic welding rapid, clean, and produces a thin and narrow seam. In addition, the mechanical pounding of ultrasonic welding causes generation of heat at the overlapping end marginal regions of the sheet to maximize melting of one or more layers therein. A typical ultrasonic welding process is carried out by holding down the overlapped ends of a flexible sheet with vacuum over a flat anvil and guiding the flat end of an ultrasonic vibrating horn transversely across the width of the sheet and along the length of the overlapped ends to form a welded seam.

U.S. Pat. No. 3,459,610 discloses ultrasonic welding of thermoplastic films, and discusses possible shapes of an ultrasonic welding tip for this purpose.

U.S. Pat. No. 5,906,698 discloses a method of ultrasonically welding seams for imaging belts.

U.S. Pat. No. 6,652,691, incorporated by reference above, discloses a method of ultrasonically welding seams for imaging belts.

SUMMARY

According to one aspect, there is provided a welding member suitable for ultrasonic welding of a seam, comprising a main body, having a width of at least 10 mm; a contact surface defined at one end of the main body, the contact surface having a first dimension in a range of 1.0-5.0 mm and a second dimension, perpendicular to the first dimension, in a range of 0.5-3.0 mm. The contact surface is defined at an end of a taper, the taper having a length of less than 5 mm between an edge of the main body and the contact surface.

According to another aspect, there is provided a method of ultrasonically welding a seam in a sheet, comprising overlapping a first edge and a second edge of a sheet by an overlap length less than 1.8 mm, forming an overlap and applying an ultrasonic welding member to the overlap. The ultrasonic welding member comprises a main body, having a width of at least 10 mm, a contact surface defined at one end of the main body, the contact surface having a first dimension in a range of 1.0-5.0 mm and a second dimension, perpendicular to the first dimension, in a range of 0.3-2.0 mm, the contact surface being defined at an end of a taper, the taper having a length of less than 5 mm between an edge of the main body and the contact surface. The ultrasonic welding member is moved along the overlap.

DETAILED DESCRIPTION

Figure 1:
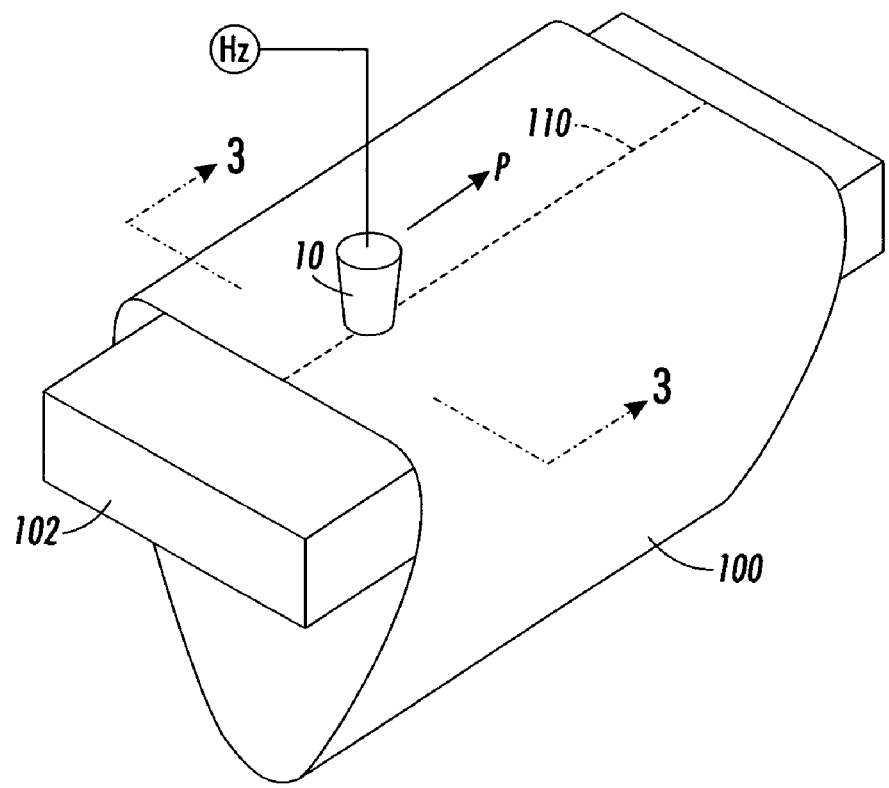
FIG. 1 is a simplified view showing the ultrasonic welding of a seam for an imaging belt, as is generally known in the prior art.

FIG. 1 is a simplified view showing the ultrasonic welding of a seam for an imaging belt, as is generally known in the prior art. A detailed description of the operation is given in the '691 patent referenced above. In brief, however, an imaging belt 100, having at least one layer comprising a thermoplastic material, is formed by taking a length of material and joining two edges thereof to form a belt. The joined edges are aligned with each other to form a seam 110 of the belt. The edges overlap by a predetermined amount and the edges are placed over an anvil 102, which includes suction means on the top thereof, for drawing the belt tightly thereon.

Once the area of the belt 100 around the seam 110 is drawn tightly over the anvil 102, an ultrasonic welding process is used to fuse portions of the adjacent edges together. Ultrasonic welding is accomplished by applying a vibrating member or "horn," indicated as 10, to the overlap area, causing certain layers of the belt material to fuse in the overlap area and thus forming seam 110. As the horn 10 vibrates, such as at a range of 20 KHz to 60 KHz, it is moved through a process direction P across the overlap area.

Figure 10:
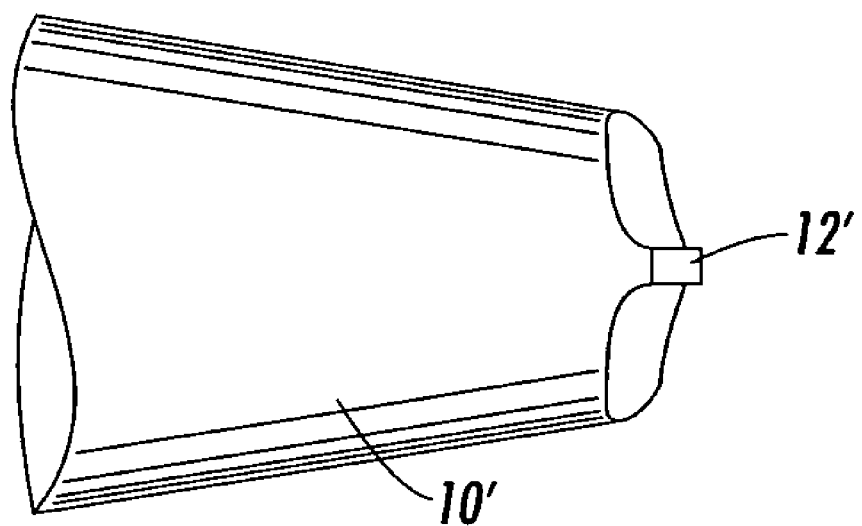
FIG. 10 is a perspective view showing a portion of an ultrasonic welding horn as used in the prior art.

FIG. 10 is a perspective view showing a portion of an ultrasonic welding horn 10' as used in the prior art. As can be seen, while one dimension of the contact surface 12' is narrow, the dimension that corresponds to that perpendicular to process direction P in FIG. 1 extends the entire length of the end of the main body, approximately 14 mm.

Figure 2:
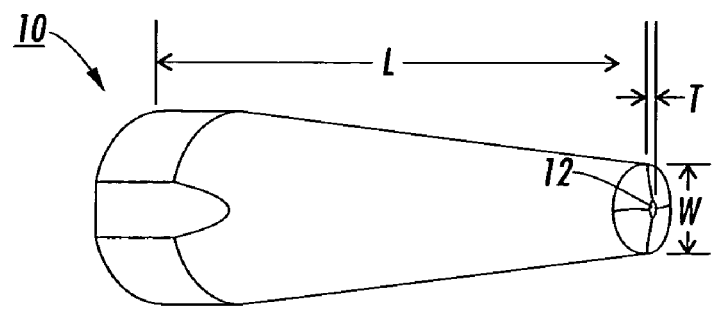
FIG. 2 shows an ultrasonic welding horn in isolation.

FIG. 2 shows a horn 10, according to the present embodiment, in isolation. The horn 10 is a single piece of heat-conductive material, such as aluminum, with a main body defining a minimum width W, a length L (perpendicular to W), and, at one end of the main body, what can be called a tapered portion, with length T, terminating in a "contact surface" 12. The main body can be substantially cylindrical or frustoconical. In this embodiment, length L is at least 50 mm; the width W is at least 10 mm, and the tapered portion has a length T of less than 5 mm.

Figure 3:
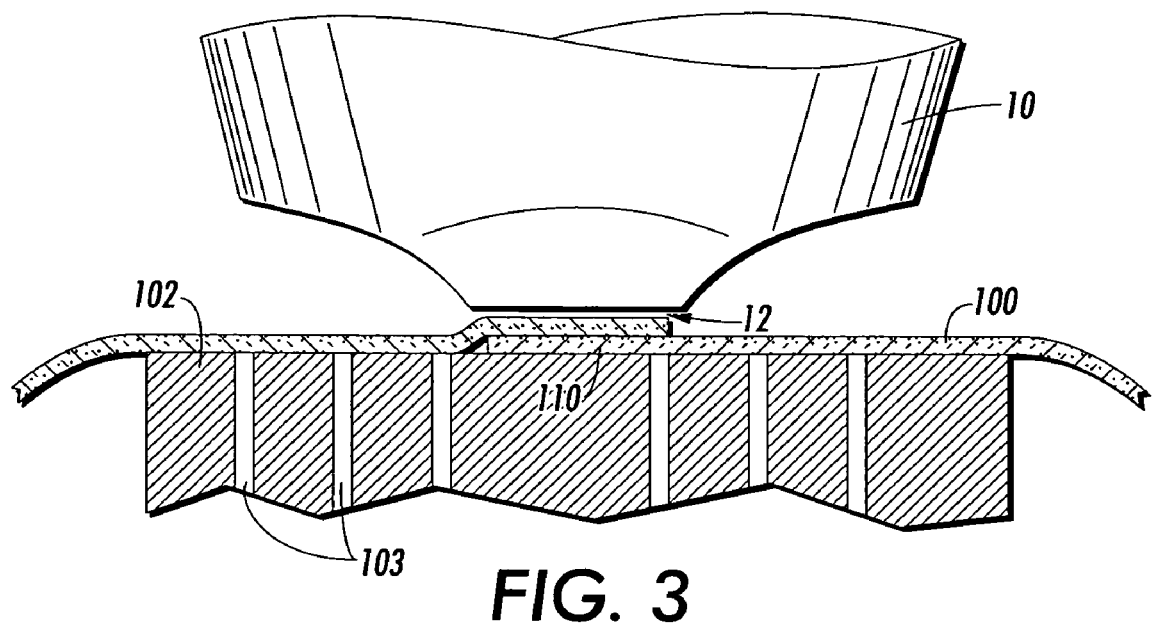
FIG. 3 is an elevational, sectional view of the end of a horn contacting an overlap area, as viewed through line 3-3 in FIG. 1, in another embodiment.

The contact surface 12 is the portion of the horn 10 that contacts the overlap area forming the seam 110. FIG. 3 is an elevational, sectional view of the end of horn 10 contacting the overlap area, as through line 3-3 in FIG. 1. The ends of the belt 100 are held tightly against anvil 102 by suction provided through channels such as 103. In a practical embodiment, the width of the overlap area forming seam 110 in the direction perpendicular to process direction P is about 1 mm, or in a range between 0.5 mm and 2 mm. The dimension of contact surface 12 in the direction perpendicular to process direction P is about 3 mm, or in a range between 1.0 mm and 5.0 mm. The dimension of contact surface 12 in the direction parallel to process direction P is about 0.8 mm, or in a range between 0.3 mm and 2.0 mm.

Figure 4:
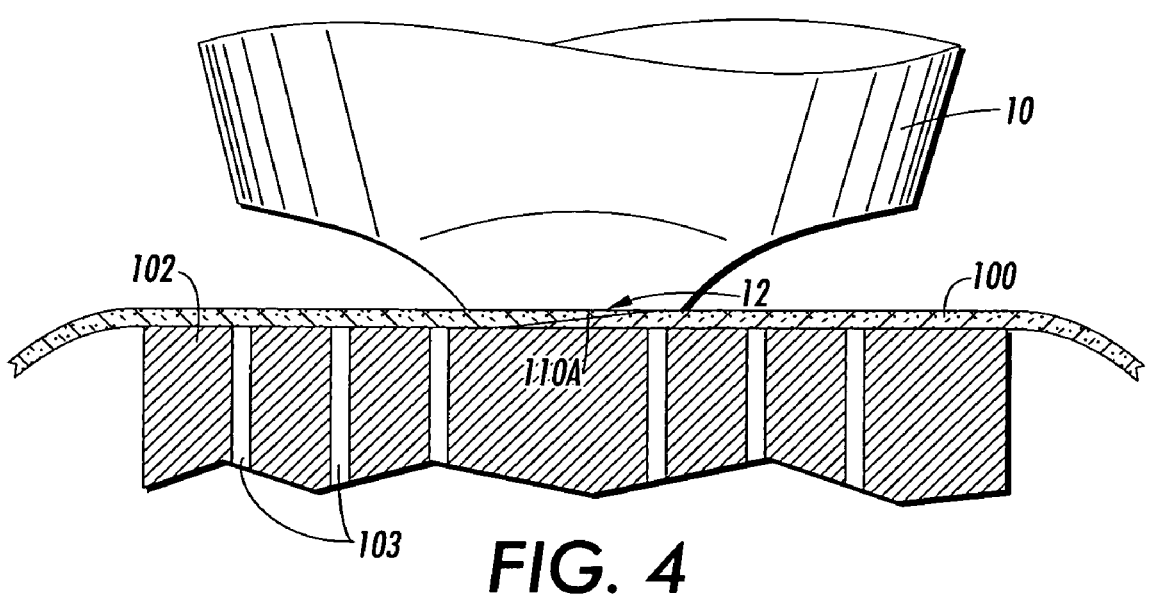
FIG. 4 is an elevational, sectional view of an area of overlap of a type of seam made with a welding horn.
Figure 5:
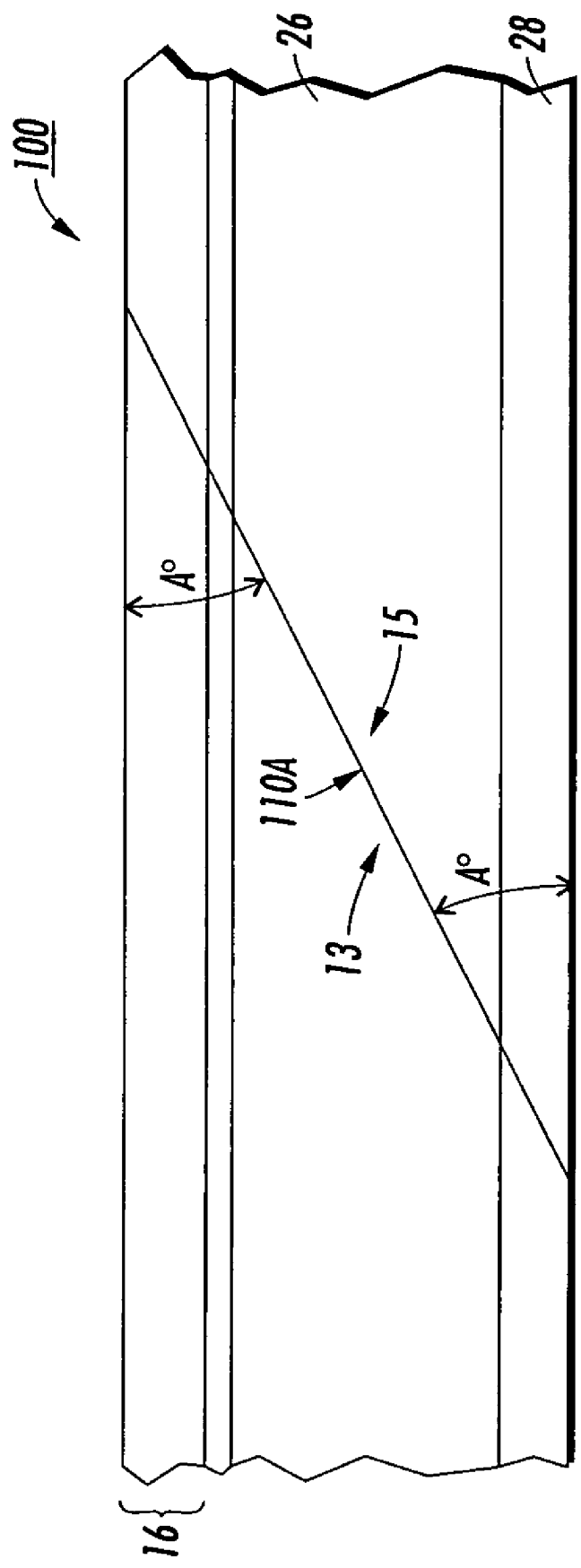
FIG. 5 shows typical layers of a flexible imaging member at the site of a seam.

FIG. 4 is an elevational, sectional view of the end of horn 10 contacting the overlap area, as through line 3-3 in FIG. 1. In this embodiment, however, the seam formed in belt 100, here called 110A, is of a type where the edges forming the seam are slanted or beveled to produce a thin welded seam. FIG. 5 is a detailed view of the seam area. In this "thin hybrid butt-lap" seam design, opposite ends of the flexible imaging member sheet are slanted-cut to produce two angled, substantially parallel, cross-sectional ends, 13 and 15, which are mated to form the seam 110A. Alternatively, material may be removed or displaced from each end of the imaging member sheet on an angle A°. The sheet is then formed into a loop, the two new matching or complementary angled ends 13 and 15 are overlaid upon one another, and subsequently joined together to form a seamed imaging member 100 by fusion bonding the abutted region into a welded seam 110A, using an ultrasonic welding horn of this disclosure.

FIG. 5 further shows typical layers of a flexible imaging member 100 at the site of a seam. A support substrate 26 is sandwiched between an anti-curl backing layer 28 and composite layer 84 that typically includes a combination of charge transport layer, charge generating layer, adhesive layer, charge blocking layer, and conductive layer. After first angled surface 13 and second angled surface 15 are brought into contact with each other to form a mated surface region and ultrasonically welded together into seam 110A using the horn of this disclosure, they form a butt-lap joint having a thickness substantially similar to the thickness in the bulk of flexible imaging member 100. This configuration of butt-lapping the edges of a sheet allows direct contact of the support substrate 26 at both ends of the original sheet regions for intimate fusion to each other during an ultrasonic seam welding process. As a result, little or no molten mixtures of imaging layer material are ejected out to the either side of the seam overlap. Direct fusing of supporting substrate 26 at first surface 13 to supporting substrate 26 at second surface 15 provides ample seam strength because of the enlarged areas of exposed supporting substrate 26 material that are mated, as well as enhanced support substrate contact for improved ultrasonic fusing. As a consequence, each layer of the belt is respectively fusion-bonded by the ultrasonic seam welding process.

Returning to FIG. 4, seam 110A is the result of the joining of two overlaid, cross-sectional angular ends by ultrasonic welding process made with the horn design of the present disclosure. In comparison to the overlapping seam 110 counterpart of FIG. 3, seam 110A is a butt-lap hybrid joint that minimizes or eliminates the existence of a localized physical discontinuity. Furthermore, the seam region created has a smoother surface with little or no added thickness and it is substantially free of upper and lower seam splashing.

A satisfactory overlap width (i.e., mated surface region or contiguous contact width) of complementary surfaces 13 and 15, measured in a direction perpendicular to the length of the mated surface region (i.e., measured in a direction transversely of the final belt), for a belt having a thickness of about 0.12 mm, is between about 0.5 millimeters and about 1.8 millimeters. An overlap length of between about 0.8 millimeters and about 1.5 millimeters is preferred. Optimum overlap for best overall seam quality improvement is achieved with an overlap length of between about 1.0 millimeters and about 1.3 millimeters. The overlap length is at least about 7 times the thickness of the belt.

The final welded seamed belt such as made according to FIG. 4 has a maximum differential in seam centerline thickness of less than 25 percent of the thickness of the sheet prior to forming into a seamed belt to minimize the adverse effects of collisions between the seam or components thereof and various subsystems of electrostatographic imaging systems. In one application, the minimum differential in seam centerline thickness is more than 4.5 percent of the thickness of the sheet prior to forming any seam to avoid any pronounced depression which could collect toner particles and other undesirable debris.

The surface profile of the first angular surface and the second surface, of flexible imaging member 100 can be modified (by including altering the shape thereof and reducing the thickness thereof) by any suitable technique. Typical surface treatment methods include chemical treatment and mechanical treatment such as abrasion, grinding, slicing, laser ablation, or polishing. Additionally, preparation of the slanted-cut ends of the imaging member sheet for hybrid butt-lap seam joining can also be obtained by utilizing a masked excimer laser ablation technique, through displacement of materials, to create the angled end cuts with the desired slanted angles at the opposite ends of the imaging member sheet prior to the mating and seam welding operations.

Figure 6:
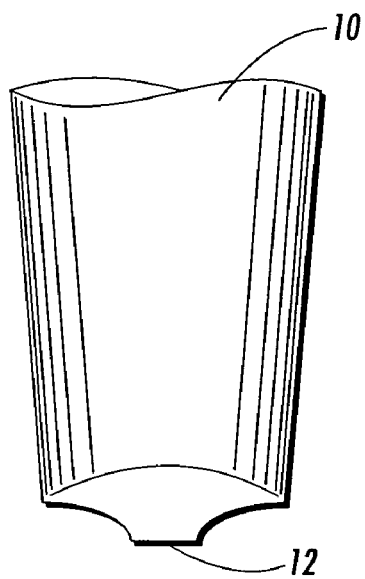
FIGS. 6 and 7 show partial orthogonal views of a portion of the horn 10 according to one embodiment.
Figure 7:
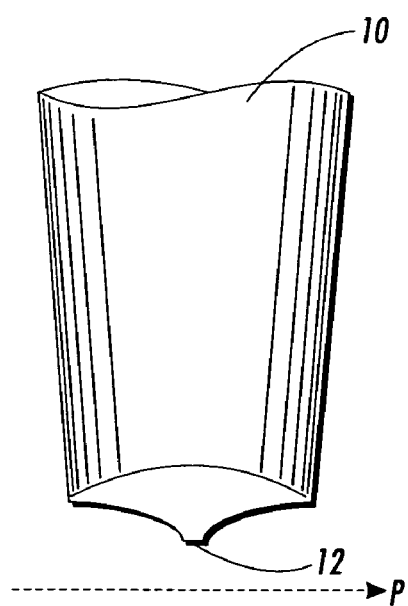

FIGS. 6 and 7 show partial orthogonal views of a portion of the horn 10 according to one embodiment. FIG. 6 shows the configuration in the direction shown in FIG. 3, while FIG. 7 shows the horn in the direction perpendicular to that shown in FIG. 6. (Process direction P is shown in FIG. 7; in the view of FIG. 6, the process direction P would be coming out of the page.) In the dimension shown in FIG. 7, the dimension of contact surface 12 in the direction perpendicular to process direction P should be at least equal to the overlap dimension, or about 3 mm. In overview, the dimension of the contact surface 12 as shown in FIG. 6 is in a range of 1.0-5.0 mm and the dimension of the contact surface 12 along process direction P as shown in FIG. 7 is in a range of 0.3-2.0 mm.

Further visible in FIGS. 6 and 7 are the shapes of the surfaces in the tapered portion that terminates in contact surface 12. As can be seen, the shapes are curved or scalloped. It should be noted that the change in width of the horn 10 from the end of the main body to the relatively small contact surface is compressed into the very small taper length T, shown in FIG. 2. The edges of the contact surface 12 are slightly rounded in this embodiment, to avoid any scratching of the belt 100 in use.

Figure 8:
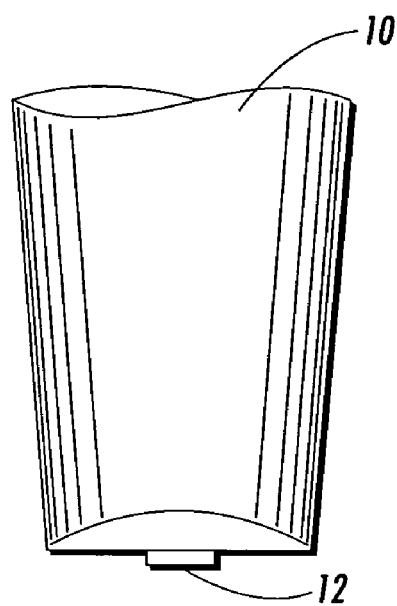
FIGS. 8 and 9 are partial orthogonal views of a portion of the horn 10 according to another embodiment.
Figure 9:
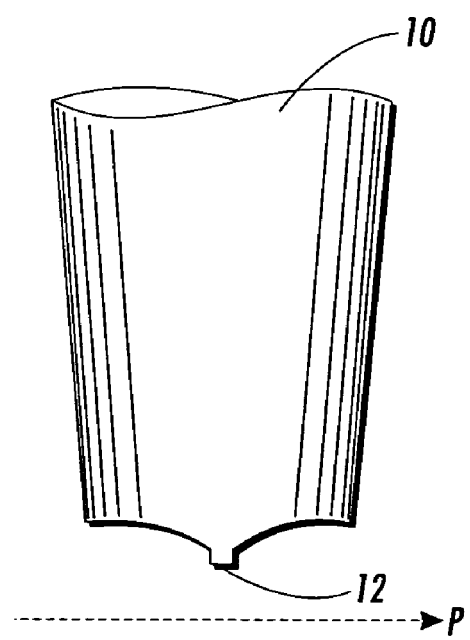

FIGS. 8 and 9 are partial orthogonal views of a portion of the horn 10 according to another embodiment, where the contact surface protrudes relatively sharply from an otherwise substantially flat end of the main body of the horn.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of ultrasonically welding a seam in a sheet, comprising:
    overlapping a first edge and a second edge of a sheet by an overlap length less than 1.8 mm, forming an overlap;
    applying an ultrasonic welding member to the overlap, the ultrasonic welding member comprising a main body, having a width of at least 10 mm, a substantially rectangular contact surface defined at one end of the main body, the contact surface having a first dimension in a range of 1.0-5.0 mm and a second dimension, perpendicular to the first dimension, in a range of 0.3-2.0 mm, the contact surface being defined at an end of a taper, the taper having a length of less than 5 mm between an edge of the main body and the contact surface, the taper defining four non-convex surfaces; and
    moving the ultrasonic welding member along the overlap along a welding process direction, wherein a dimension of the contact surface of the welding member perpendicular to the welding process direction is at least as long as the overlap length.

2. The method of claim 1, further comprising creating an angled surface on each of the first edge and second edge.

3. The method of claim 1, wherein the overlap length is between about 0.5 millimeters and about 1.8 millimeters.

4. The method of claim 3, wherein the overlap length is between about 0.8 millimeters and about 1.5 millimeters.

5. The method of claim 1, wherein the overlap length is at least about 7 times a thickness of the belt.

6. The member of claim 1, the taper defining four cut surfaces.

7. The member of claim 6, at least two of the cut surfaces being planar.

8. The member of claim 6, at least two of the cut surfaces being curved.

9. The member of claim 6, the contact surface defining non-sharp edges with at least two of the cut surfaces.

10. The member of claim 1, the main body having a substantially round cross-section through the width thereof.

* * * * *